May 13, 1924.
S. SZABO ET AL
1,494,038
CARROUSEL
Filed Dec. 8, 1922
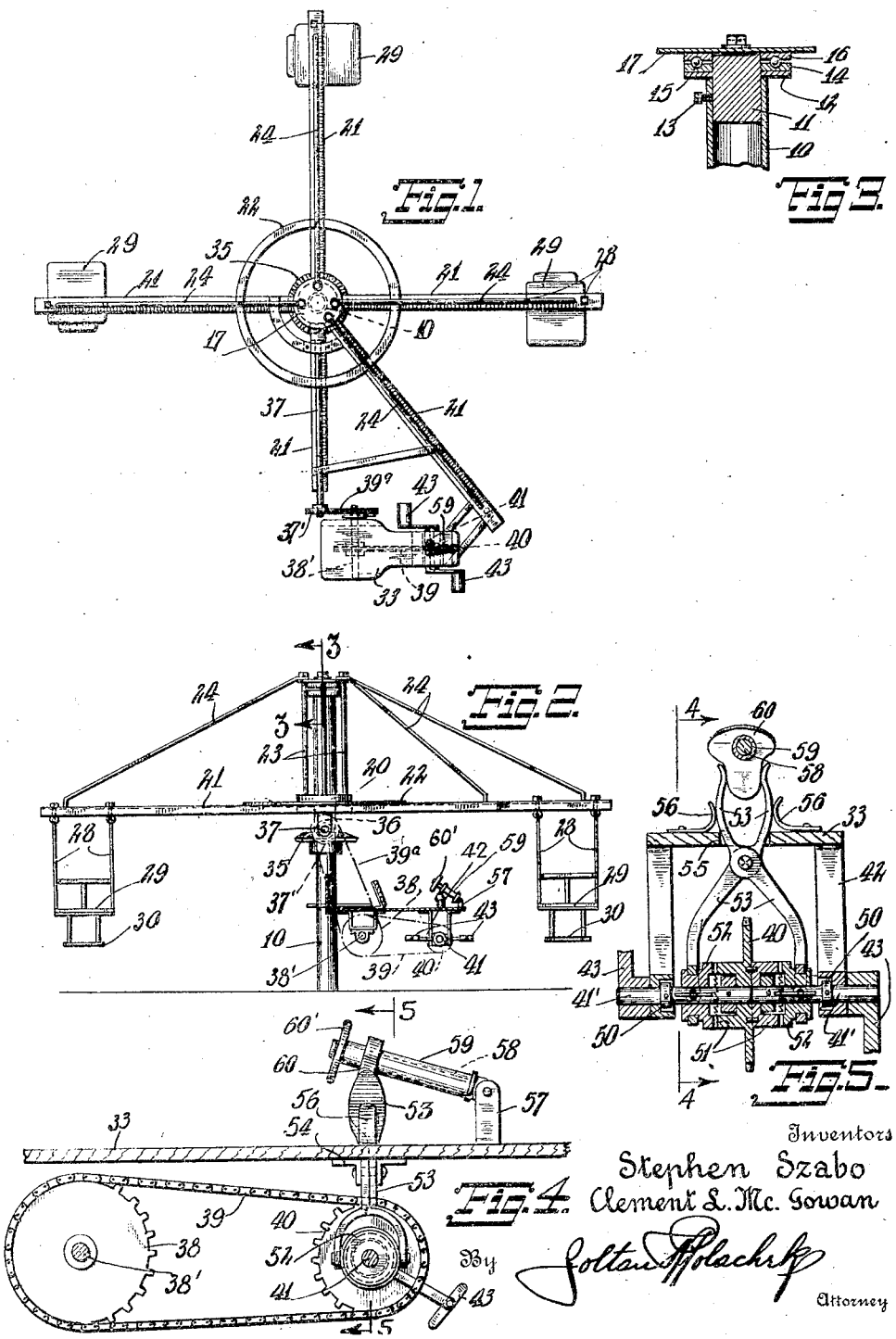
Inventors
Stephen Szabo
Clement L. McGowan
By Zoltan Polachek
Attorney Patented May 13, 1924.

1,494,038

UNITED STATES PATENT OFFICE.

STEPHEN SZABO AND CLEMENT L. McGOWAN, OF ATLANTA, GEORGIA.

CARROUSEL.

Application filed December 8, 1922. Serial No. 605,580.

*To all whom it may concern:*

Be it known that we, STEPHEN SZABO and CLEMENT L. MCGOWAN, citizens of the United States, residing at Atlanta, in the county of Fulton and State of Georgia, have invented certain new and useful Improvements in Carrousels, of which the following is a specification.

This invention relates generally to carrousels, having more particular reference to a small carrousel for children which is operated by the users thereof.

The invention has for an object the provision of a simple form of carrousel of this type, a further specific object relating to the provision of a novel form of clutch release means whereby the carrousel may be permitted to travel under its own momentum.

For further comprehension of the invention, and of the objects and advantages thereof, reference will be had to the following description and accompanying drawings and to the appended claims in which the various novel features of the invention are more particularly pointed out.

Fig. 1 of the drawings is a plan view of our improved carrousel.

Fig. 2 is a side elevation thereof.

Fig. 3 is a fragmentary vertical section of the upper end of the main post, this view being taken on the line 3—3 of Fig. 2.

Fig. 4 is a detail sectional view taken on the line 4—4 of Fig. 5 and illustrating the drive means.

Fig. 5 is a detail sectional view at right angles to Fig. 4, and taken on the line 5—5 of the latter figure.

Referring now to the drawings, the reference numeral 10 indicates the main central post of our improved carrousel, this post being firmly fixed in the ground, or on any suitable base. Fixed in the upper end of the post 10 is a plug 11 having a radial flange 12 which rests on the post top, this flange being located a short distance below the upper end of the plug. The plug is here shown as fixed in the post by means of a set screw 13. Surrounding the upper end of the plug 11, and seating on the flange 12, is a flat ring 14 whose upper face is arranged to form a ball race to receive the ball bearings 15. Resting on these bearings 15 is a second flat ring 16 which is bolted or otherwise fixed to an upper disk 17 of larger diameter than the ring.

Freely surrounding the post 10, at a distance below the top thereof, is a collar 20 from which a number of arms 21 project radially, these arms being braced together by a ring 22 to which they are secured. The collar 20 is suspended from the disk 15 by means of rods 23, while the outer ends of the arms 21 are supported by the inclined guy rods 24 which connect said outer ends with the disk 15.

Suspended from the outer ends of certain of these arms are pairs of rods 28 which support the seats 29 and foot rests 30. Certain others of these arms serve to jointly support a driver's seat 33 adjacent which are provided means for rotating the carrousel. As here shown a bevel gear 35 is fixed to the post 10 and is engaged by a bevel pinion 36 fixed on the inner end of a shaft 37 supported by, and extending along the adjacent arm 21. Upon the outer end of this shaft 37 is a sprocket wheel 37' over which is looped a sprocket chain 39ª looped also over one of a pair of sprocket wheels 38 on a shaft 38' mounted under the seat 33. Looped over the other sprocket wheel 38 is a chain 39 engaging also over a sprocket wheel 40 on a stub shaft 41 carried in brackets 42 depending from the seat, the stub shaft 41 having crank pedals 43 on its ends for operation by the driver to propel the carrousel. The stub shaft carrying the crank pedals 43 is divided at a point midway between its ends into two sections on which the respective pedals are fixed. The sprocket wheel 40 is loose on the adjacent ends of the stub shaft sections, being held against axial movement by means of a pair of collars 50 fixed to said shaft sections one on each side of the sprocket wheel 40. The sprocket wheel 40 is formed with clutch faces 51 adapted to be engaged by clutch members 52 feathered on the respective sections of the shaft 41. These clutch members 52 are adapted to be shifted by a pair of levers 53 fulcrumed on a common bracket 54 depending from the seat 33 and having their upper ends projecting through a slot 55 in said seat. Springs 56, bear on the levers to hold them in position with the clutch members 52 engaged with the clutch faces 51.

Pivoted at one end to a bracket 57 projecting upward from the seat 33 is a rod 58 on which is rotatable a sleeve 59 having a substantially pear shaped cam member 60 thereon which is adapted to engage between the top ends of the levers 53, the sleeve having a handwheel 60' thereon for purposes of rotation. By rotating the sleeve 59 in either direction the desired one of the levers 53 may be shifted, permitting the driver to propel the carrousel with one foot only, while if it is desired to allow the carrousel to coast under its own momentum the cam 60 is pressed downward, by swinging the sleeve and rod on the pivot bracket 57, to push the widened part of the cam between the levers, thus releasing both of the clutch members from engagement with the sprocket wheel 40.

It is to be understood of course that various other changes and modifications might be made in the construction of our improved carrousel without departing from the spirit and scope of our invention.

Having thus described our invention what we claim as new and desire to protect by Letters Patent of the United States is as follows:

1. A carrousel comprising a support, a gear fixed to said support, a passenger carrying element mounted on said support and rotatable therearound, and propelling means for said element comprising a pair of foot pedals, stub shafts on which the respective pedals are fixed, clutched members slidable on said stub shafts, a power transmitting wheel adapted to be engaged by either or both of said clutch members, a second gear carried by said passenger carrying element engaging said first gear, means forming an operative connection between said wheel and said second gear, and means for shifting said clutch members individually or in unison.

2. A carrousel comprising a support, a gear fixed to said support, a passenger carrying element mounted on said support and rotatable therearound, and propelling means for said element comprising a pair of foot pedals, stub shafts on which the respective pedals are fixed, clutched members slidable on said stub shafts, a power transmitting wheel adapted to be engaged by either or both of said clutch members, a second gear carried by said passenger carrying element engaging said first gear, means forming an operative connection between said wheel and said second gear, and means for shifting said clutch members individually or in unison, comprising levers engaged with the respective clutch members, and a rotary and bodily movable cam element adapted to engage between said levers.

3. A carrousel comprising a support, a gear fixed to said support, a passenger carrying element mounted on said support and rotatable therearound, and propelling means for said element comprising a pair of foot pedals, stub shafts on which the respective pedals are fixed, clutched members slidable on said stub shafts, a power transmitting wheel adapted to be engaged by either or both of said clutch members, a second gear carried by said passenger carrying element engaging said first gear, means forming an operative connection between said wheel and said second gear, and means for shifting said clutch members individually or in unison, comprising levers engaged with the respective clutch members, a rod pivoted at one end, a sleeve rotatable on said rod, and a cam on said sleeve.

4. A carrousel comprising a support, a gear fixed to said support, a passenger carrying element mounted on said support and rotatable therearound, and propelling means for said element comprising a pair of foot pedals, stub shafts on which the respective pedals are fixed, clutched members slidable on said stub shafts, a power transmitting wheel adapted to be engaged by either or both of said clutch members, a second gear carried by said passenger carrying element engaging said first gear, means forming an operative connection between said wheel and said second gear, and means for shifting said clutch members individually or in unison, comprising levers engaged with the respective clutch members, a rod pivoted at one end, a sleeve rotatable on said rod, and a cam on said sleeve, and springs pressing on said levers to cause them to hold the clutch members in operative position.

In testimony whereof we have affixed our signatures.

STEPHEN SZABO.
CLEMENT L. McGOWAN.